C. P. FLANAGAN.
FEED RECEPTACLE.
APPLICATION FILED JUNE 1, 1909.
954,948.
Patented Apr. 12, 1910.
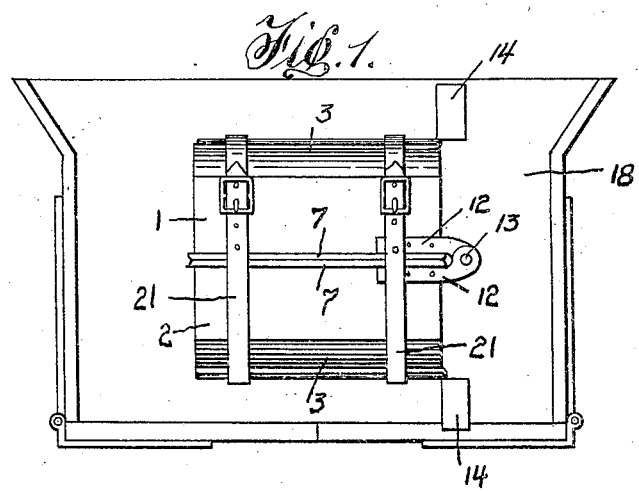
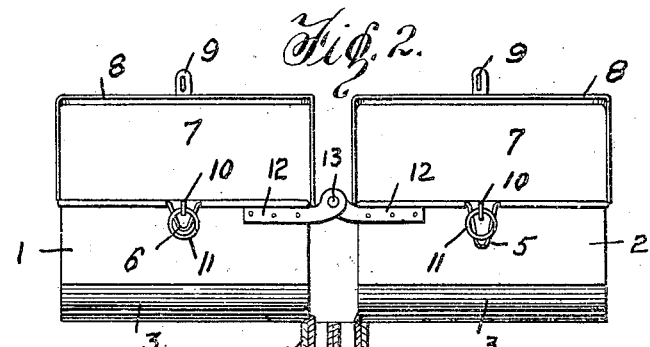
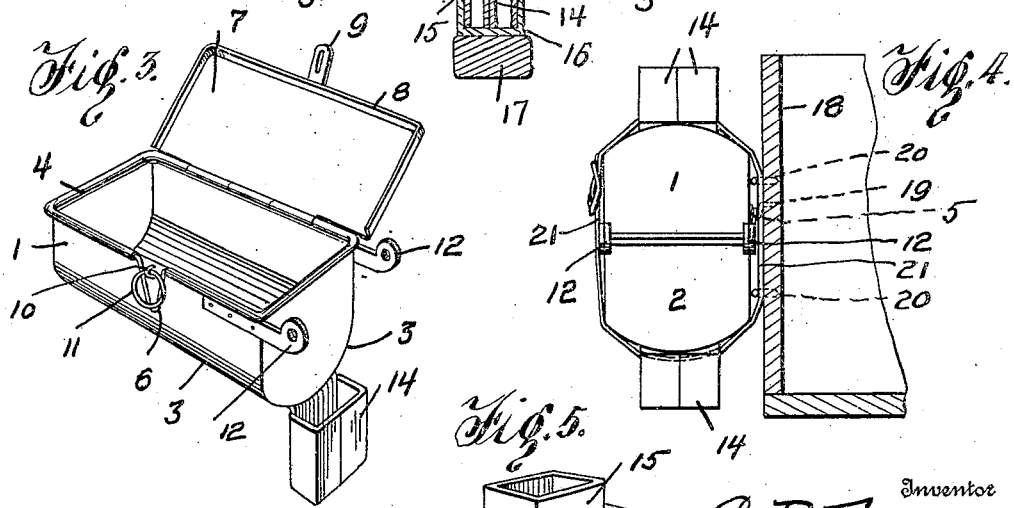
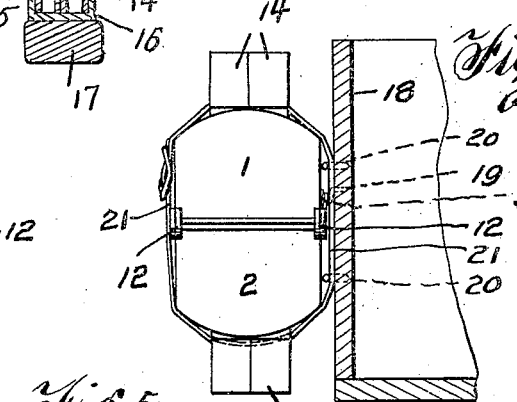
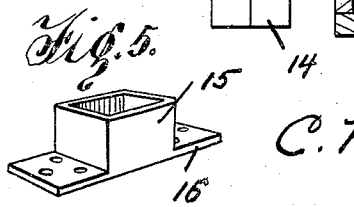
Inventor
C. P. FLANAGAN

UNITED STATES PATENT OFFICE.

CHARLES P. FLANAGAN, OF ALTOONA, PENNSYLVANIA, ASSIGNOR OF NINE-TENTHS TO BLANCHE M. FLANAGAN, OF ALTOONA, PENNSYLVANIA.

FEED-RECEPTACLE.

954,948.  Specification of Letters Patent.  Patented Apr. 12, 1910.

Application filed June 1, 1909. Serial No. 499,288.

*To all whom it may concern:*

Be it known that I, CHARLES P. FLANAGAN, a citizen of the United States of America, residing at Altoona, in the county of Blair and State of Pennsylvania, have invented certain new and useful Improvements in Feed-Receptacles, of which the following is a specification, reference being had therein to the accompanying drawing.

This invention relates to feed receptacles, and more particularly to that type of portable receptacle adapted to be carried by a vehicle, to contain feed for the animals used for drawing a vehicle.

The invention has for its primary object to provide a portable feed box that can be compactly carried in connection with a vehicle and easily placed in position for animals to obtain food from the same.

Another object of this invention is to provide a portable feed box that will be sanitary, saving and highly efficient for the purpose for which it is intended.

A further object of this invention is to furnish novel means in connection with a feed box for attaching the same to a vehicle, either in an active or inactive position.

A still further object of this invention is to provide a simple, inexpensive and durable feed box particularly designed for dump wagons and such vehicles where the animals hitched to the same are generally fed without unhitching.

With the above and other objects in view which will more readily appear as the invention is better understood, the same consists in the novel construction, combination and arrangement of parts to be hereinafter described and then claimed.

In the drawings:—Figure 1 is an end view of a vehicle provided with a feed box, Fig. 2 is a front elevation of the feed box as mounted upon the tongue of a vehicle, Fig. 3 is a perspective view of one of the feed receptacles, Fig. 4 is a longitudinal sectional view of a portion of a vehicle equipped with the feed boxes, and Fig. 5 is a perspective view of a socket used in connection with the tongue of a vehicle.

In the accompanying drawings, 1 and 2 designate oblong receptacles having semi-cylindrical bottoms 3, said receptacles having the upper edges thereof reamed, as at 4, with the front reamed edges thereof provided with pivoted yokes 5 and 6, the yoke 5 of the receptacle 2 being of a greater length than the yoke 6 of the receptacle 1, for a purpose that will presently appear.

7 designates a lid hinged to the rear reamed edge of each feed receptacle, said lid having flanged edges 8 for fitting down over the reamed upper edges of the feed receptacle. The free edge of the lid 7 is provided with a hasp 9 to fit over a staple 10 carried by the front side of the feed receptacle, said receptacle being detachably held in engagement with said staple by a split ring or lock 11.

12 designates hinged members carried by one end of each receptacle, the members of said receptacles being connected together by a pivot pin 13, which permits of the receptacles being swung together, when the lids 7 thereof are closed.

14 designates depending metallic members carried by the confronting ends of the receptacles 1 and 2, these members contacting with one another to fit in the sockets 15, carried by the plate 16 secured to the tongue 17 of a vehicle.

18 designates the rear end of a vehicle, as a dump wagon, which is provided with a hook 19 and staples 20. The hook 19 is adapted to engage the yokes 5 and 6 of the receptacles when the same are folded together, as best shown in Fig. 4, and to prevent these receptacles from becoming accidentally displaced, straps 21 extend through the staples 20 and retain the feed receptacles upon the end of a vehicle. The socket 15 is located at a convenient point upon the tongue of the vehicle, whereby when the feed receptacles are opened and supported by said socket, said feed receptacles will be correctly positioned to permit of the horses hitched to the vehicle feeding from the receptacles. The curved bottoms of these receptacles, allow the horses to remove practically the entire contents of the feed receptacle, while the lid 7 in an open position prevents considerable waste, as grain and such matter falling upon the lid is deflected into the receptacle.

The feed receptacles are constructed of light and durable metal, preferably of a non-corrodible character, and the receptacles can be strapped under or upon any part of a vehicle, whereby the same will not interfere with the general operation of the vehicle or become injured by any part of the vehicle.

While in the drawing there is illustrated a preferred embodiment of the invention, it is to be understood that the structural elements thereof can be varied or changed as to the size, proportion and manner of assemblage without departing from the spirit and scope of the invention.

Having now described my invention, what I claim as new, is;—

1. In a feed box, the combination of a plurality of foldable receptacles hinged together, an extension carried by and projecting at right angles with respect to one end of each of said receptacles, said extensions adapted to be moved to abutting engagement when the receptacles are extended, and vertically-disposed means adapted to receive said extensions when the receptacles are extended, whereby the receptacles are maintained in longitudinal alinement with respect to each other.

2. In a feed box, the combination of a plurality of foldable receptacles hinged together at one end, an extension connected to the hinged end of each receptacle and extending at right angles with respect thereto, said extensions adapted to be moved to abutting engagement when the receptacles are extended, and vertically-disposed means adapted to receive said extensions when the receptacles are extended whereby the receptacles are maintained in longitudinal alinement with respect to each other.

3. In a feed box, the combination of a plurality of foldable receptacles hinged together, an extension carried by and projecting at right angles with respect to one end of each of said receptacles, said extensions adapted to be moved to abutting engagement when the receptacles are extended, vertically-disposed means adapted to receive said extensions when the receptacles are extended, whereby the receptacles are maintained in longitudinal alinement with respect to each other, a hinged lid for each of said receptacles, and means for maintaining the lids closed when the receptacles are folded.

4. In a feed box, the combination of a plurality of foldable receptacles hinged together at one end, an extension connected to the hinged end of each receptacle and extending at right angles with respect thereto, said extensions adapted to be moved to abutting engagement when the receptacles are extended, vertically-disposed means adapted to receive said extensions when the receptacles are extended whereby the receptacles are maintained in longitudinal alinement with respect to each other, a hinged lid for each of said receptacles, and means for maintaining said lids closed when the receptacles are folded.

In testimony whereof I affix my signature in the presence of two witnesses.

CHARLES P. ☓ FLANAGAN.
(his mark)

Witnesses:
EVA A. MILNE,
K. H. BUTLER.